United States Patent [19]
Dietrich, Sr.

[11] 3,815,958

[45] June 11, 1974

[54] ASSEMBLY FOR ATTACHING AUXILIARY WHEELS TO A TRACTOR

[75] Inventor: William J. Dietrich, Sr., R. R. Congerville, Ill.

[73] Assignee: Dietrich Manufacturing Inc., Goodfield, Ill.

[22] Filed: Jan. 18, 1973

[21] Appl. No.: 324,871

[52] U.S. Cl. .............................. 301/41 R, 301/52
[51] Int. Cl. ............................................ B60b 15/00
[58] Field of Search ..... 301/39 R, 39 T, 39 C, 40 S, 301/40 R, 41 R, 52, 36 R, 9 TV, 47

[56] References Cited
UNITED STATES PATENTS
3,713,701   1/1973   Penner ......................... 301/39 C Primary Examiner—M. Henson Wood, Jr.
Assistant Examiner—Reinhard J. Eisenzopf
Attorney, Agent, or Firm—Dawson, Tilton, Fallon and Lungmus

[57] ABSTRACT

A dual or auxiliary drive wheel with a plurality of expandable arms, each provided with a cleat-engaging lug, removably secured to a detachable rim which contains the cleats for holding it. The rim is fastened to the wheel with bolt fasteners.

4 Claims, 2 Drawing Figures

PATENTED JUN 11 1974   3,815,958

ASSEMBLY FOR ATTACHING AUXILIARY WHEELS TO A TRACTOR

BACKGROUND AND SUMMARY

The present invention relates to an assembly for attaching dual wheels to a tractor. Dual or auxiliary wheels are frequently attached to the existing drive wheels or front wheels of a tractor in order to obtain greater traction, greater location, greater stability, etc. Further, there are a number of different types of auxiliary wheels which can be attached to the tractor. For example, steel cage wheels, dual rubber wheels, or cleated metal wheels may be used, depending upon the desired result.

There are a number of different types of systems for securing these dual wheels to tractors. One such system includes a Y-shaped spoke arrangement with a central hub in which a threaded shaft is journaled. Attached to the threaded shaft are three L-shaped crank arms. The crank arms are also pivotally connected to the spokes, and as the shaft is turned, the crank arms extend inwardly and outwardly of the center of the dual wheel. In this arrangement, the wheel rim is provided with cleats which are welded directly to it, and the pivoting crank arms are provided with lugs for engaging the cleats when the crank arms are expanded, thereby holding the dual wheel to the main drive wheel. Such a system is manufactured by P. B. Bettinson and Co., Ltd. of Holbach, England.

The present invention is an improvement on the type of dual wheel attachment assembly just described. In order for this type of system to be used on a tractor, the cleats must be located on the tractor wheel rims at pre-determined locations, and they are then welded to the wheel rim. Not only must the cleats be rather accurately located in order to receive the expanding lugs, but I have found that most farmers are reluctant to weld directly to a wheel rim, particularly when a tire is mounted to it due to the possibility of damage to the tire from the heat. It will be realized that at least three such cleats must be welded to each wheel rim to which a dual wheel is to be mounted. Further, once the cleats are mounted, it is impossible to use that dual wheel with another tractor without mounting a separate set of cleats to the other tractor. Further, this is not the only type of dual wheel mounting assembly that farmers use, and with the present invention, a farmer may use this type of dual wheel mounting assembly with one type of dual wheel, and use another type of mounting assembly, such as the one disclosed in my application Ser. No. 133,674, for "Attachable Dual Drive Wheel," filed Apr. 13, 1971.

Briefly, the present invention provides for an intermediate rim which is removably fastened to the main drive wheel of the tractor and which contains the cleats mounted in pre-located positions. The dual wheel with the expansion lug mounts to the auxiliary rim of the present invention in the same manner in which it has heretofore been secured to the main tractor wheel rim; however, once it is removed, the auxiliary rim can also be easily removed so that the same tractor will accommodate auxiliary wheels with different type mounting arrangements.

It will thus be realized that the present invention affords the advantages of not having to weld lugs to the main tractor wheel rims in order to use the type of mounting assembly described herein. Further, the changing of dual wheel mounting assemblies from one type to another is greatly facilitated in that the cleats are removed with the auxiliary rim.

The same tractor can thus be used with a conventional dual wheel mounting assembly as well as the one described above. The auxiliary rim preferably has an outwardly turned flange for strengthening it because of the rugged conditions encountered in use.

Other features and advantages of the present invention will be apparent to persons skilled in the art from the following detailed description of a preferred embodiment accompanied by the attached drawing.

THE DRAWING

FIG. 1 is a vertical cross sectional view of a main tractor wheel rim with a dual wheel attached to it according to the present invention; and FIG. 2 is a partially broken away side view of the main tractor wheel rim with an auxiliary rim constructed according to the present invention attached to it.

DETAILED DESCRIPTION

Figure 1:
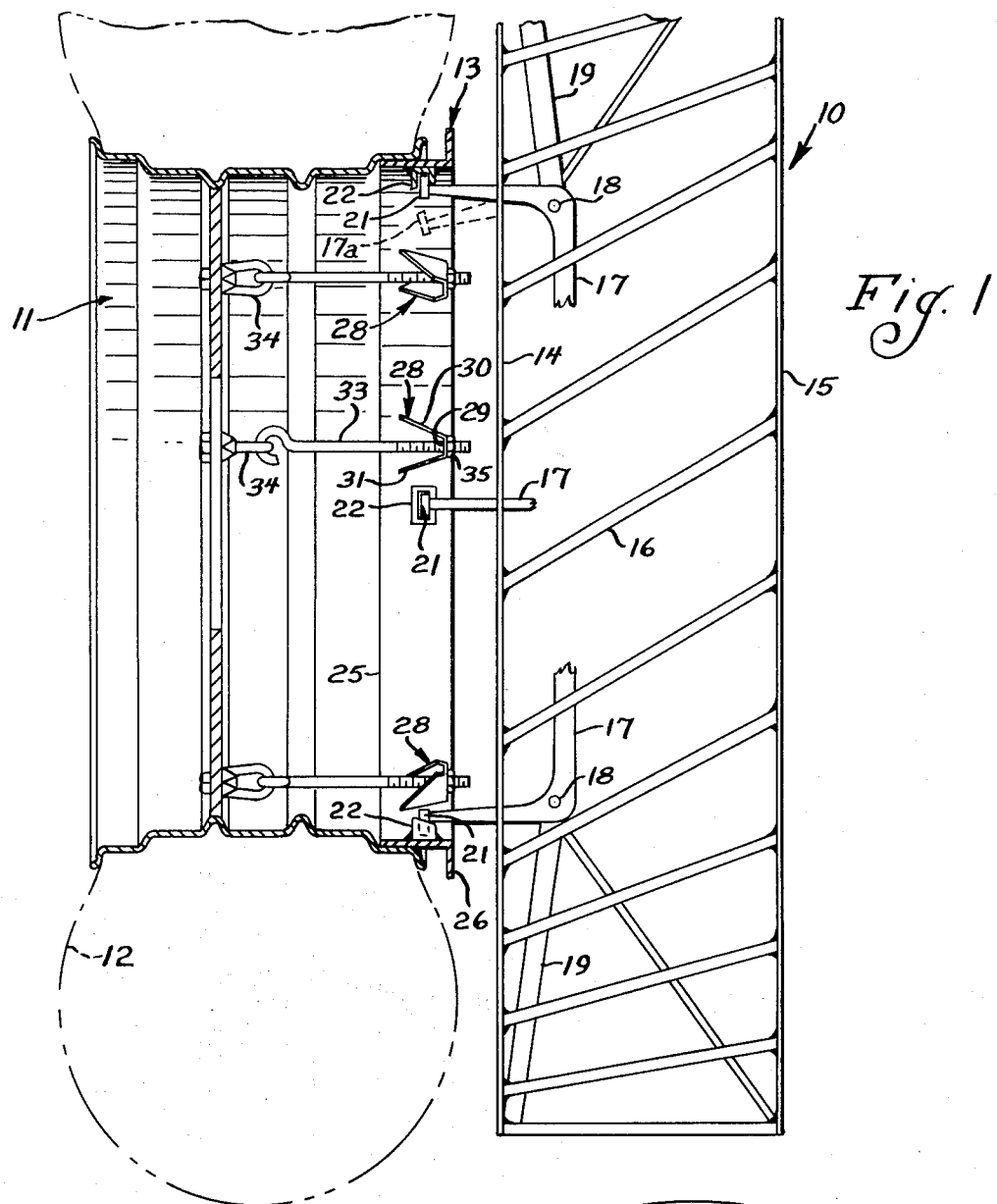
Figure 2:
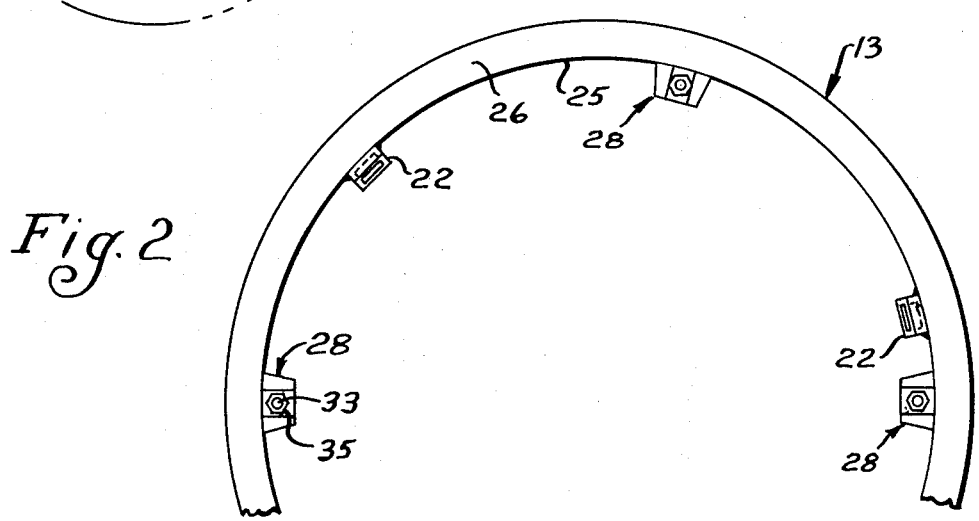

Turning to the drawing, reference numeral 10 generally designates a conventional dual wheel of the so-called "cage" type; reference numeral 11 generally designates a wheel rim of a tractor, the associated tire being shown in phantom by the chain line 12. Reference numeral 13 generally designates an auxiliary rim which is detachably mounted to the main tractor wheel rim 11 in a manner to be described, and which serves for mounting the auxiliary wheel 10.

The auxiliary or dual wheel 10 includes first and second rims 14 and 15 between which a plurality of steel bars 16 extend. The dual wheel 10 also includes a plurality of L-shaped crank arms 17 which are pivotally connected as at 18 to radially extending members or spokes 19.

In the illustrated embodiment there are four crank arms 17, although only three are shown.

The central, inner portions of the crank arms 17 are, as mentioned above, joined to a centrally located threaded shaft which is received in a hub of the wheel 10 and, when turned, will move the crank arms 17 between the attaching positions shown in dark line and removing positions, one of which is shown in dashed line and indicated by reference numeral 17a at the top of FIG. 1. The distal ends of the crank arms 17 are provided with lugs 21 which are received in corresponding cleats or sockets 22 which, in turn, are welded to the inner surface of the removable auxiliary rim 13. The cleats or sockets 22 are preferably located and welded at a factory by the manufacturer, thereby insuring the accuracy of their placement.

The rim 13, includes an inner cylindrical wall member 25 to the inner surface of which the cleats 22 are welded and an outer peripheral flange 26 which strengthens the rim 13 and resists deflection under the rugged use conditions that are normally encountered. Other means may equally well be used to strengthen the cylindrical wall member 25, such as forming grooves, etc.

In order to secure the auxiliary rim 13 to the main tractor wheel rim 11, a plurality of anchor members generally designated 28 are welded to the cylindrical wall 25 of the auxiliary rim. Each of the anchor members 28 includes an outer bearing wall 29 and inclined side wall 30, 31, forming a general V-shape. The bearing wall 29 is provided with an aperture which receives a threaded bolt fastener 33 which is secured to the main tractor wheel rim 11 by means of an eye bolt 34 in a conventional manner. A nut, designated 35 secures the auxiliary wheel rim 13 by engaging the bearing wall 29 of the mounting lug 28 when it is turned on the bolt fastener 33.

Installation of the dual wheel 10 is accomplished by securing the auxiliary rim 13 in place with the bolt fasteners which are placed through the apertures in the bearing walls 29 of the attaching lugs 28, and held there by means of the nuts 35. Next, the dual wheel 10 is secured to the auxiliary rim in a conventional manner.

With the present invention, I have found that the lugs or sockets 22 can be more accurately and reliably welded to the auxiliary rim than they can be to the main tractor wheel rim due to the more controlled environment in a manufacturer's production facility. In addition, the welding of the lugs 22 to the auxiliary rim does not involve potential damage to the tires on the main tractor rim; and when it is desired to remove the dual wheel 10, the auxiliary rim 13 may quite easily be removed at the same time, thereby leaving the main tractor wheel rim 11 adapted for other types of dual wheels.

Having disclosed in detail a preferred embodiment of the present invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. An assembly for attaching a dual wheel to a main tractor wheel rim, the dual wheel including a plurality of expandable crank arms provided with attaching lugs adapted to be received in corresponding cleats when said crank arms are expanded for holding said dual wheel, the improvement comprising: an auxiliary rim including a generally cylindrical wall portion, a plurality of cleats secured to the radially inner side of said wall portion and positioned to receive associated ones of said lugs when said crank arms are expanded, and means for strengthening said auxiliary rim against deflection; and fastener means for removably securing said auxiliary rim to said main tractor wheel.

2. The system of claim 1 wherein said fastening means comprises: a plurality of anchor members secured to the inner surface of said cylindrical wall portion of said auxiliary rim; a plurality of bolt fasteners; an eye bolt secured to said main wheel rim for each of said bolt fasteners and engaging one end thereof, the other end of each bolt fastener being threaded and received in a corresponding anchor member on said auxiliary rim; and a nut for securing each bolt fastener to its associated anchor member.

3. The structure of claim 2 wherein each of said anchor members comprises a flat bearing wall adapted to engage an associated nut securing a bolt fastener; and first and second outwardly inclined race walls extending inwardly of said main tractor wheel rim and outwardly of an associated bolt fastener for bracing said bearing wall.

4. The structure of claim 1 wherein said auxiliary rim further comprises a radially outwardly extending peripheral flange for strengthening the same against deflection.

* * * * *